(12) United States Patent
Miller, III et al.

(10) Patent No.: US 7,892,527 B2
(45) Date of Patent: Feb. 22, 2011

(54) ACID-GAS ABSORBING TABLET AND METHOD OF USE

(75) Inventors: Stanley B. Miller, III, Eden Prairie, MN (US); Louis Patrone, Hamburg, NY (US); Patricia A. Ziarniak, Alden, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 666 days.

(21) Appl. No.: 11/487,556

(22) Filed: Jul. 14, 2006

(65) Prior Publication Data

US 2006/0257478 A1 Nov. 16, 2006

Related U.S. Application Data

(63) Continuation of application No. 09/768,016, filed on Jan. 23, 2001, now Pat. No. 7,083,804.

(51) Int. Cl.
*A61K 9/14* (2006.01)
*A61K 9/20* (2006.01)
*A61L 11/00* (2006.01)
*A01N 25/24* (2006.01)

(52) U.S. Cl. .................. 424/76.5; 424/77; 424/464; 424/489

(58) Field of Classification Search .................. None
See application file for complete search history.

(56) References Cited

U.S. PATENT DOCUMENTS

| 4,094,957 | A | * | 6/1978 | Sartori et al. ............... 423/223 |
| 4,104,192 | A | * | 8/1978 | Yoshikawa et al. ...... 252/188.22 |
| 6,146,446 | A | * | 11/2000 | Tuma et al. ................... 95/90 |
| 7,083,804 | B2 | * | 8/2006 | Miller et al. ................. 424/464 |
| 2006/0188688 | A1 | * | 8/2006 | Sasaki et al. .................. 428/68 |

FOREIGN PATENT DOCUMENTS

| JP | 2001025632 A | * | 1/2001 |
| WO | WO 9522403 A1 | * | 8/1995 |

* cited by examiner

*Primary Examiner*—S. Tran
(74) *Attorney, Agent, or Firm*—Paul A. Leipold, Esq.; Stephen B. Salai, Esq.; Harter Secrest & Emery LLP

(57) ABSTRACT

An acid-gas absorbing tablet including in relatively sufficient proportions an adsorbent which may be activated carbon or silica gel or a mixture thereof, potassium carbonate, polyvinylpyrrolidinone, and potassium bicarbonate. A method of absorbing acid gases from a confined environment utilizing the above tablet by inserting it into the confined environment.

15 Claims, 2 Drawing Sheets

ACID-GAS ABSORBING TABLET AND METHOD OF USE

CROSS-REFERENCE TO RELATED APPLICATIONS

This application is a Continuation of U.S. patent application Ser. No. 09/768,016, FILED Jan. 23, 2001, entitled Acid-Gas Absorbing Tablet and Method of Use, incorporated by reference.

STATEMENT REGARDING FEDERALLY SPONSORED RESEARCH OR DEVELOPMENT

Not Applicable.

BACKGROUND OF THE INVENTION

The present invention relates to a gas-absorbing tablet for placement in confined spaces for absorbing deleterious acid gases.

By way of background, in confined environments, such as computer hard drives and other types of computer and electronic devices, volatile organic and other acid gases are generated which may deleteriously affect them. In the past, activated carbon in granular and tablet form has been used to absorb acid gases in the foregoing types of devices. This carbon has been used in both untreated and salt-treated forms.

BRIEF SUMMARY OF THE INVENTION

It is the object of the present invention to provide a gas-absorbing tablet which can be placed in a confined environment for efficiently absorbing acid gases generated therein which may deleteriously affect subject matter within the confined environment.

A more specific object of the present invention is to provide a gas-absorbing tablet which may be placed in an electronic apparatus enclosure for absorbing acid gases which may deleteriously affect the electronic components.

Another object of the present invention is to provide an improved method of absorbing acid gases in a confined environment such as in a computer hard drive and other types of computer environments. Other objects and attendant advantages of the present invention will readily be perceived hereafter.

The present invention relates to an acid-gas absorbing tablet comprising in relatively sufficient proportions by weight at least one adsorbent, a binder and a basic salt.

The present invention also relates to a method of absorbing acid gases from an electronic device comprising the steps of preparing an acid-gas absorbing tablet comprising in relatively sufficient proportions by weight at least one adsorbent, a binder, and at least one basic salt, and installing said acid-gas absorbing tablet in said electronic device.

The various aspects of the present invention will be more fully understood when the following portions of the specification are read.

DETAILED DESCRIPTION OF THE INVENTION

Figure 1:
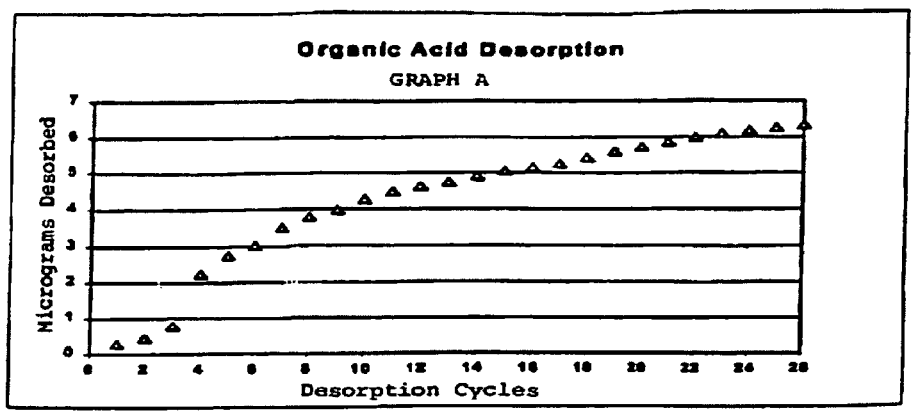
FIG. 1 is a graph labeled Graph A, and is a plot of micrograms desorbed versus desorption cycles for the tablet described in the example, containing $KHCO_3$.

In computer hard drives and other confined electronic devices including computer-type devices where organic acid gases are present, it is desirable to absorb these organic acid gases so that they will not deleteriously affect subject matter in the confined environment.

In accordance with the present invention a tablet is provided which will absorb the organic and other acid gases which are generated. These gases include one or more of acetic acid, hydrogen sulfide and hydrochloric acid. The tablet comprises at least one adsorbent, a basic salt and a binder. Also, a mold release agent, including but not limited to silicone-free materials, can be mixed with the foregoing components for aiding in the removal of the molded tablet from the die which forms it. The tablet may be a rectangular solid having a length of about ¾ of an inch, a width of about ¼ inch and a height of about ¼ inch, but it can have other dimensions.

Preferred adsorbents are activated carbon or silica gel or a blend thereof in any proportions. The activated carbon or silica gel adsorbent or blend in any proportions may be present by weight in an amount of between about 73% and 93%, and more preferably between about 78% and 88%, and most preferably between about 80% and 85%. The activated carbon or silica gel or a combination in any proportion may have a particle size of between about 10 and 325 mesh, and more preferably between about 30 and 230 mesh, and most preferably between about 50 and 200 mesh. While the foregoing adsorbents are preferred, other adsorbents including indicating silica gel, molecular sieve and cellulose materials, without limitation, may be used.

The preferred binder is polyvinylpyrrolidinone which may be present in an amount of between about 4% and 25%, and more preferably between about 8% and 17%, and most preferably between about 9% and 11%. Any standard tabletting binder may be substituted for the polyvinylpyrrolidinone. Other binders, without limitation, which may be used include sodium silicate, microcrystalline cellulose, methyl cellulose, HPMC cellulose and CMC cellulose plus a variety of gum based adhesives. The foregoing listed binders act in the same manner as described hereafter as the polyvinylpyrrolidinone, namely, they will adsorb the acid gases and thereafter release them.

The preferred basic salt is potassium carbonate, and it may be present in an amount of between about 0.2% and 8.4%, and more preferably between about 0.8% and 4%, and most preferably between about 1.5% and 2.5%. Basic salts having a Ph of between about 7 and 12 may be substituted for the potassium carbonate and such compounds include, without limitation, potassium bicarbonate, sodium bicarbonate and sodium carbonate. As noted hereafter, the potassium carbonate is mixed with the adsorbent, and its function is to absorb the major portion of the acid gases. As summarized hereafter, the potassium carbonate combines chemically with the acid gas and produces carbon dioxide and water as byproducts. The water is adsorbed by the adsorbent and the carbon dioxide is released to the atmosphere. The preferred basic salt may be used by itself or in combination with another basic salt, as discussed hereafter.

Another basic salt which is preferably present is potassium bicarbonate, and it may be present in an amount of between about 0.5% and 7%, and more preferably between about 1.5% and 4%, and most preferably between about 2.5% and 3%.

Other basic salts having a Ph of between 7 and 12 may be substituted for the potassium bicarbonate, and such compounds include, without limitation, potassium carbonate, sodium bicarbonate and sodium carbonate. The function of the potassium bicarbonate is to preferentially absorb acid gases directly and thereafter also absorb the acid gases which have been adsorbed by the binder and thereafter desorbed therefrom. The reason that potassium bicarbonate is used in addition to the potassium carbonate is because it mixes more readily with the binder. Potassium carbonate is preferentially used with the adsorbent due to its greater capacity to absorb the acid gases, thus maximizing the total acid-gas absorption capacity. However, as noted above, potassium carbonate or any other suitable basic salt, including but not limited to salts in the hydroxide and amine families, may be used with the binder, but a bicarbonate is preferred. As summarized hereafter, the polyvinylpyrrolidinone adsorbs and releases the acid gases, and the bicarbonate thereafter chemically combines therewith and releases carbon dioxide and water. The water is adsorbed by the adsorbent, and the carbon dioxide is vented to the atmosphere.

The gas-absorbing tablet may also contain water in an amount of up to 30%, and more preferably up to about 15%, and most preferably up to about 2%.

In addition to the foregoing, a suitable amount of die-releasing lubricant can be mixed with the composition and in this instance is comprised of aluminum stearate. Other suitable die-releasing agents may be used.

EXAMPLE

A tablet has been formulated having the following composition by weight:

| | |
|---|---|
| Activated Carbon/Silica Gel Blend* | 84% |
| $K_2CO_3$ | 2% |
| $KHCO_3$ | 3% |
| Polyvinylpyrrolidinone | 9% |
| Aluminum Stearate (silicone free) | 1% |
| $H_2O$ | 1% |

*The specific ratio by weights of the blend is 80% activated carbon and 20% silica gel.

However, the ratio of carbon/silica gel blend can range from 100% carbon to 100% silica gel. Carbon includes but is not limited to activated nutshell or petroleum bases carbons, which may be commercially available treated or untreated carbon. Silica gel includes but is not limited to type A, B and AB.

The above tablet has been fabricated in the following manner. The carbon or silica gel or a blend thereof in any proportion and potassium carbonate were blended in a planetary blender for approximately 10 minutes. Thereafter, the blend was permitted to set for about 24 hours. However, the mixing of the foregoing components may be achieved in any way for between 2 and 60 minutes, and the setting may be for anywhere between about 2 and 72 hours, as long as equilibrium is achieved during the time period. After the foregoing mixture has set, aluminum stearate was added and resulting composition was blended for approximately 5 minutes until well blended. However, the blending may be effected for between 1 minute and 30 minutes. After the foregoing, the potassium bicarbonate and polyvinylpyrrolidinone were blended in a simple vane mixer until homogeneous. Thereafter, the mixture of potassium bicarbonate and polyvinylpyrrolidinone were added to the mixture of carbon or silica gel or a blend thereof with the potassium carbonate and all these ingredients were blended in a sigma mixer at a temperature of about 54° C. for approximately two hours until the mixture was well blended and ready for tabletting. However, the mixing can be effected in any suitable time of between about one hour and eight hours and the final temperature range can be between about 10° C. and 180° C. The tabletting of the final mixture was effected in a tablet press at a pressure of between about 5,000 and 12,000 pounds per square inch.

When another compound is substituted for the potassium bicarbonate in the above formulation, the mixing procedure is essentially the same in that the substituted compound is separately mixed with the polyvinylpyrrolidinone for the purpose of insuring intimate contact therewith. Therefore, even though separate mixings have been effected, there may only be one basic salt present if potassium carbonate was substituted for the potassium bicarbonate.

The above-described tablet functions in the following manner. The basic salt which was mixed with the adsorbent absorbs the acid gases by converting the acid gases to non-deleterious substances. The chemical reaction of the basic salt and an acid gas produces a salt plus carbon dioxide gas plus water. Thus the deleterious acid gas is eliminated. The carbon dioxide gas is vented to the atmosphere, and the water is adsorbed by the adsorbent and ultimately released to the atmosphere when the adsorbent is heated during operation of the hard drive or the electronic or computer device. The polyvinylpyrrolidinone binder will adsorb the acid gas, but there will be no chemical change as when the acid gas reacts with the basic salt, as described above. However, since there is no chemical change, the acidic gas will be desorbed from the binder and pass into the portion of the tablet outside of the binder where the basic salt is present in the tablet, and the basic salt will then absorb the acid gas in the above-described manner. As noted above, the basic salt which operates most efficiently is the potassium bicarbonate which mixes more readily with the polyvinylpyrrolidinone than the potassium carbonate.

The Figures show the tablets' performance in retaining an organic acid. In this respect, three 8-10 mg samples in which the adsorbent was 100% activated carbon in the above specific formulation containing potassium carbonate, potassium bicarbonate and polyvinylpyrrolidinone were tested on a Dynatherm tester and the results were plotted in the following charts. The testing showed that the average of three specimens absorbed 139 micrograms of acetic acid and only 6 micrograms were desorbed after having been subjected to twenty-six desorption cycles. Thus, the percent of the original amount of acid absorbed and thereafter released by the tablet was less than about 5%. The foregoing is represented on the following GRAPH A and GRAPH B both entitled "Organic Acid Desorption" included in FIGS. 1 and 2, respectively.

In FIGS. 1-4, illustrating GRAPHS A, B, C and D, respectively, each cycle consisted of subjecting each sample (8-10 mg) to a specific heat for four minutes. The temperature of each cycle is shown in the following table wherein each cycle is listed sequentially.

| Cycles | Temperature (° C.) |
|---|---|
| 1 | 100 |
| 1 | 125 |
| 1 | 150 |
| 3 | 200 |
| 3 | 225 |
| 4 | 250 |
| 4 | 275 |
| 9 | 300 |

By way of further explanation, the first three sequential cycles were each performed for four minutes at 100° C., 125° C. and 150° C., respectively. Thereafter, there were three sequential four minute cycles at 200° C., 225° C., 250° C., etc, for a total of 26 cycles. In other words, each specimen was subjected to twenty-six sequential four minute cycles, and the amount of acid gas desorbed was measured. Each plot shows the cumulative amount of acid gas desorbed. In other words, the graphs do not show the specific amount desorbed at each cycle, but the total amount desorbed to the end of that cycle.

FIG. 1 labeled GRAPH A plots micrograms desorbed versus desorption cycles.

Figure 2:
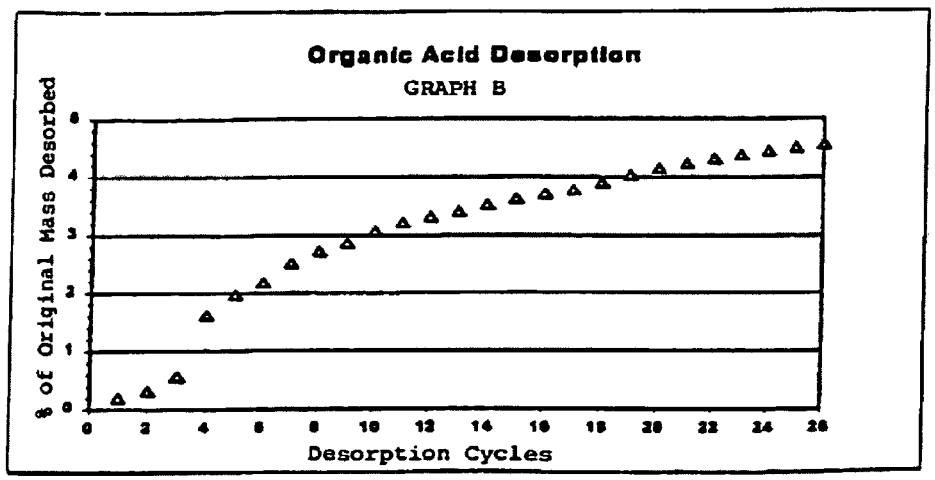
FIG. 2 is a graph labeled Graph B, relating to the same subject matter of FIG. 1, but plotting the percent of original mass desorbed versus desorption cycles.
Figure 3:
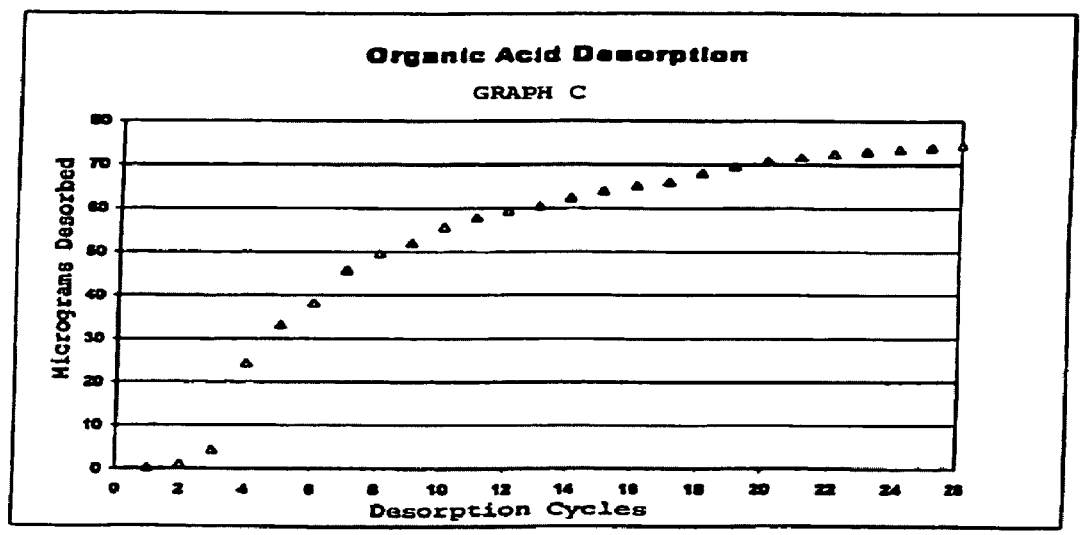
FIG. 3 is a graph labeled Graph C and is a plot of micrograms desorbed versus desorption cycles for the tablet described in the example, but not containing $KHCO_3$.
Figure 4:
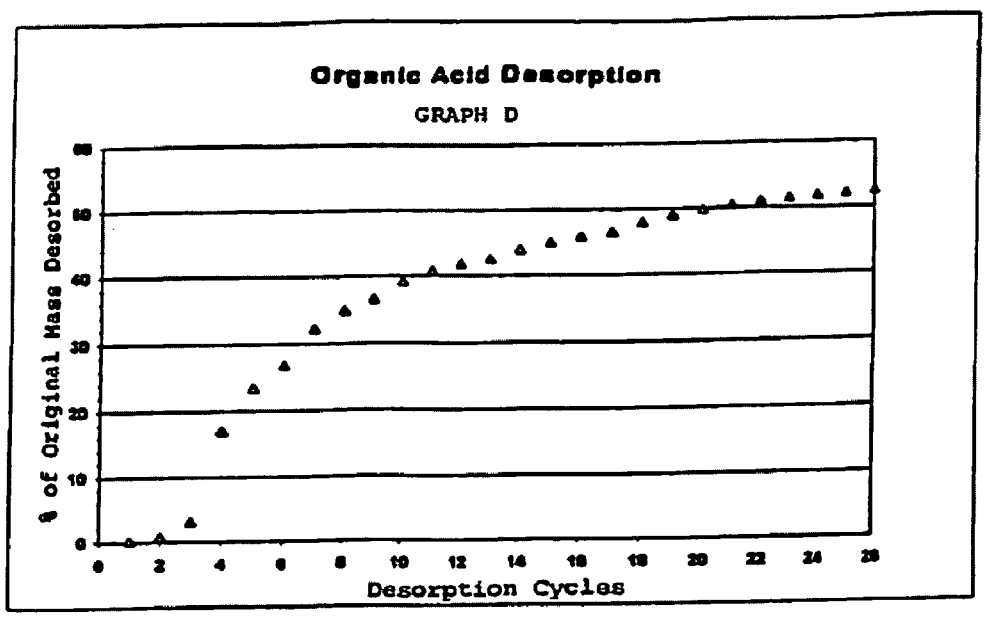
FIG. 4 is a graph labeled Graph D relating to the same subject matter of FIG. 3, but plotting the percent of original mass desorbed versus desorption cycles.

As illustrated in FIG. 2, GRAPH B relates to the same subject matter as shown in FIG. 1, GRAPH A. However, the plot is the percent of original mass desorbed plotted against desorption cycles.

From both graphs it can be seen that the amount desorbed tends to level off after twenty-six desorption cycles.

GRAPHS A and B show the desorption characteristic of the exemplary tablet which contains the $KHCO_3$. The significance of the $KHCO_3$ can be appreciated when GRAPHS A and B are compared to GRAPHS C and D illustrated in FIGS. 3 and 4, respectively, wherein the tablet did not contain the $KHCO_3$. The tablet of GRAPHS C and D contained adsorbent in the amount of 87% (which was 100% activated carbon) and potassium carbonate in the amount of 2% and 9% polyvinylpyrrolidinone and 1% aluminum stearate and 1% water. The potassium carbonate was mixed only with the adsorbent, and this mixture was thereafter mixed with the polyvinylpyrrolidinone. Briefly, when GRAPH A is compared to GRAPH C, it can be seen that the total amount desorbed in GRAPH A is 6.3 micrograms as compared to 75 micrograms in GRAPH C, thereby illustrating the capacity of the $KHCO_3$ to greatly limit desorption. The same result is evident from a comparison of GRAPH B wherein 4.5% of the original mass is desorbed as compared to GRAPH D wherein 52% of the original mass is desorbed.

The terms "absorb" and "absorbing" used above are intended to mean that the gas is chemically changed as a result of the reaction, whereas the terms adsorb and desorb are intended to mean that the gas is not chemically changed as a result of being combined with and released from, respectively, the binder and the adsorbent.

While the above description has referred to an adsorbent being used with both the adsorbent and the binder, under certain circumstances it may be desirable to use the absorbent with only the binder.

While the above description has referred to electronic apparatus, computers and a computer hard drive, it will be appreciated that the acid-gas absorbing tablets and method of the present invention are also applicable to other types of electronic equipment including but not limited to DVD's, optical readers, etc.

While preferred embodiments of the present invention have been disclosed, it will be appreciated that it is not limited thereto but may be otherwise embodied within the scope of the following claims.

We claim:

1. An acid-gas absorbing tablet comprising in relatively sufficient proportions by weight at least one adsorbent, a binder, a first basic salt, a second basic salt, said first basic salt being blended with said adsorbent, and said second basic salt being in intimate contact with said binder wherein said second basic salt comprises potassium bicarbonate or sodium bicarbonate.

2. An acid-gas absorbing tablet as set forth in claim 1 wherein said first basic salt is selected from the group consisting of sodium and potassium carbonates, and said second basic salt is selected from the group consisting of sodium and potassium bicarbonates.

3. A method of absorbing acid gases from an electronic device comprising the steps of providing an acid-gas absorbing tablet comprising in relatively sufficient proportions by weight at least one adsorbent, a binder, a first basic salt primarily blended with said adsorbent, a second basic salt in intimate contact with said binder, and installing said acid-gas absorbing tablet in said electronic device wherein said first basic salt is selected from the group consisting of sodium and potassium carbonates, and wherein said second basic salt is selected from the group consisting of sodium and potassium bicarbonates.

4. A method of fabricating a mixture for producing an acid-gas absorbing tablet comprising the steps of providing an adsorbent and a first basic salt, blending said adsorbent and said first basic salt to produce a first mixture, providing a binder and a second basic salt, blending said binder and said second basic salt to produce a second mixture, and blending said first and second mixtures, wherein said first and second basic salts are different and wherein said first basic salt is selected from the group consisting of sodium and potassium carbonates, and wherein said second basic salt is selected from the group consisting of sodium and potassium bicarbonates.

5. A method of fabricating a mixture as set forth in claim 4 wherein said adsorbent is selected from the group of activated carbon, silica gel, and mixtures thereof.

6. A method of fabricating a mixture as set forth in claim 5 wherein said binder comprises polyvinylpyrrolidinone.

7. A method of fabricating a mixture as set forth in claim 5 wherein said adsorbent is in any proportions including total activated carbon or total silica gel.

8. A method of fabricating said acid-gas absorbing tablet from the mixture set forth in claim 4 including the step of pressing said blend of said first and second mixtures into a tablet.

9. An acid-gas absorbing tablet comprising a first blended mixture of at least one adsorbent and a first basic salt, a second mixture of a binder and a second basic salt in intimate contact, and a blended mixture of said first and second mixtures and wherein said second basic salt is selected from the group consisting of sodium and potassium bicarbonates.

10. An acid-gas absorbing tablet as set forth in claim 9 wherein said binder is polyvinylpyrrolidinone.

11. An acid-gas absorbing tablet as set forth in claim 10 wherein said absorbent is selected from the group, consisting of carbon, silica and mixtures thereof.

12. An acid-gas absorbing tablet as set forth in claim 1 wherein the binder comprises polyvinylpyrrolidinone.

13. An acid-gas absorbing tablet as set forth in claim 12 wherein said at least one adsorbent comprises a carbon or silica gel.

14. An acid-as absorbing tablet as set forth in claim 13 wherein said at least one basic salt comprises potassium carbonate or sodium carbonate.

15. An acid-gas absorbing tablet as set forth in claim 1 where in the second basic salt and said binder are a homogenous mixture.

* * * * *